(12) United States Patent
Lee et al.

(10) Patent No.: US 7,349,305 B2
(45) Date of Patent: Mar. 25, 2008

(54) WOBBLE SIGNAL REPRODUCING DEVICE AND METHOD

(75) Inventors: Han-seung Lee, Ansan-si (KR); Jung-eun Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 585 days.

(21) Appl. No.: 11/036,357

(22) Filed: Jan. 18, 2005

(65) Prior Publication Data

US 2005/0157618 A1 Jul. 21, 2005

(30) Foreign Application Priority Data

Jan. 19, 2004 (KR) ...................... 10-2004-0003996

(51) Int. Cl.
*G11B 7/00* (2006.01)
(52) U.S. Cl. ............................... 369/47.28; 369/44.13; 369/53.34
(58) Field of Classification Search ..................... None
See application file for complete search history.

(56) References Cited

U.S. PATENT DOCUMENTS

| | | | | |
|---|---|---|---|---|
| 5,825,733 A | * | 10/1998 | Ogawa ..................... | 369/47.48 |
| 5,852,599 A | * | 12/1998 | Fuji ......................... | 369/275.4 |
| 6,246,649 B1 | * | 6/2001 | Ohta et al. ................. | 369/47.28 |
| 2001/0026512 A1 | * | 10/2001 | Nishimura et al. ....... | 369/47.26 |
| 2006/0044962 A1 | * | 3/2006 | Ishibashi et al. ......... | 369/44.28 |

FOREIGN PATENT DOCUMENTS

JP 11-161961 6/1999

OTHER PUBLICATIONS

Japanese Patent Office Action, mailed Mar. 6, 2007 and issued in corresponding Japanese Patent Application No. 2005-011448.

* cited by examiner

*Primary Examiner*—William Korzuch
*Assistant Examiner*—Peter Vincent Agustin
(74) *Attorney, Agent, or Firm*—Staas & Halsey LLP

(57) ABSTRACT

A wobble signal reproducing device and method. The wobble signal reproducing device may include a computation unit for outputting a push-pull signal by use of a signal picked up by wobbling an optical disc; a wobble band pass filter (BPF) unit for applying band pass filtering to the push-pull signal based on a first control signal, applying low pass filtering to the band pass filtering-applied signal based on a second control signal, and outputting a wobble signal; a wobble phase locked loop (PLL) unit for generating a channel clock signal based on the wobble signal, wherein the first and second control signals correspond to the channel clock signal, the wobble BPF unit applies the band pass filtering at a center frequency varying based on the first control signal, and applies the low pass filtering at a cutoff frequency varying based on the second control signal. Accordingly, the wobble signal reproducing device and method can effectively reproduce a wobble signal in the CLV mode as well as in the CAV mode in which the spindle motor rotates at a constant speed.

16 Claims, 6 Drawing Sheets

A+D

B+C (A+D)−(B+C)

WOBBLE SIGNAL REPRODUCING DEVICE AND METHOD

CROSS-REFERENCE TO RELATED APPLICATION

This application claims benefit under 35 U.S.C. § 119 from Korean Patent Application No. 2004-3996, filed on Jan. 19, 2004, the entire content of which is incorporated herein by reference.

BACKGROUND OF THE INVENTION

1. Field of the Invention

The present invention relates to an optical reproducing device, and more particularly, to a wobble signal reproducing device for reproducing a wobble signal recorded on writable optical discs.

2. Description of the Related Art

Optical discs are classified into once-writable discs such as CD-R, DVD-R and the like, and re-writable discs such as CD-RW, DVD-RW, DVD-RAM, and the like, in addition to read-only discs such as CD-ROM and DVD-ROM. Unlike such existing read-only discs, as for the re-writable discs, a channel clock signal cannot be generated from a reproducing signal. Thus, the re-writable discs have grooves wobbled in a certain period having information, and a wobble signal is detected so that a channel clock signal necessary for writing data is generated.

Furthermore, the CD/DVD read/write modes are divided into the constant linear velocity (CLV) mode and the constant angular velocity (CAV) mode depending on a spindle motor control method, and, in general, the CLV mode is employed for a low speed operation, and the CAV mode is employed for a high speed operation. The CLV mode causes the spindle motor to spin fastest in the innermost of a disc and to spin slowest in the outermost of the disc, and has the same frequency characteristics in the innermost and outermost of the disc. However, the CAV mode spins the spindle motor at a constant speed regardless of which portion of the disc information is accessed from, and the innermost and outermost of the disc has a 2.4 times difference in frequency.

FIG. 1 is a block diagram for showing a conventional wobble signal reproducing device, and FIGS. 2A-2C explain a wobble signal reproducing process for the wobble signal reproducing device shown in FIG. 1.

As shown in FIG. 1, as for the light amount corresponding to the wobble signal measured in the portions A, B, C, and D on the disc, the adders 11 and 13 add the light amounts corresponding to the portions A and D and the light amounts corresponding to the portions B and C, and, as shown in FIG. 2A and FIG. 2B, the adders 11 and 13 output a (A+D) signal and a (B+C) signal, respectively, that have an RF signal in phase and a wobble signal in 180° phase difference. The (A+D) signal and the (B+C) signal are filtered through high-pass filters (HPFs) 21 and 23 each having a cut-off frequency sufficient to pass the wobble signal, so that a DC offset is removed.

Next, automatic gain controllers (AGC) 31 and 33 maintain the amplitude of the RF signal constant, so as to prevent the RF signal from being missed due to the wobble signal.

The subtractor 41 performs the subtraction between the gain-controlled (A+D) and (B+C) signals, and outputs a wobble signal as shown in FIG. 2C. The narrow-band pass filter (BPF) 45 filters the output wobble signal to detect a wobble signal having a high signal-to-noise (S/N) ratio, the automatic gain controller 47 amplifies its gain, and the comparator 49 quantizes the wobble signal, and then outputs a wobble clock signal.

The above existing wobble signal producing device has the band-pass filter 45 consisting of an active RC filter for a center frequency, and varies the center frequency of the band-pass filter 45 under controls of a system controller according to the variations of read/write speeds. The above control approach of the band-pass filter 45 has a disadvantage that the system controller controls the band-pass filter 45 every time the speed changes.

Furthermore, with signal reproducing speeds increasing, the above approach has a problem of deviating the pass band of the band-pass filter owing to an access limit of the system controller in case that the wobble signal is reproduced in the CAV mode. Thus, this causes the S/N ratio of the wobble signal to be reduced as well as the jitter in the wobble clock signal to be increased.

SUMMARY OF THE INVENTION

Embodiments of the present invention have been developed in order to solve the above drawbacks and other problems associated with the conventional arrangement. An aspect of the present invention is to provide a wobble signal reproducing device capable of effectively reproducing a wobble signal even when the CAV mode is used to reproduce a signal coping with a signal reproducing speed becoming faster.

Additional aspects and/or advantages of the invention will be set forth in part in the description which follows and, in part, will be obvious from the description, or may be learned by practice of the invention.

The forgoing and other objects and advantages are substantially realized by providing a computation unit for outputting a push-pull signal by use of a wobbled signal picked up by wobbling an optical disc; a wobble band pass filter (BPF) unit for applying band pass filtering to the push-pull signal based on a first control signal, applying low pass filtering to the band pass filtering-applied signal based on a second control signal, and outputting a wobble signal; a wobble phase locked loop (PLL) unit for generating a channel clock signal based on the wobble signal, wherein the first and second control signals correspond to the channel clock signal, the wobble BPF unit applies the band pass filtering at a center frequency varying based on the first control signal, and applies the low pass filtering at a cutoff frequency varying based on the second control signal.

The wobble BPF unit may include a band pass filter having a switched capacitor filter (SCF) varying the center frequency according to a switching frequency being the first control signal, and for applying the band pass filtering at the varied center frequency; and a smoothing filter having a gm-C low pass filter for varying the cutoff frequency according to a control voltage signal being the second control signal, and applying the low pass filtering at the varied cutoff frequency according to an embodiment of the present invention.

The wobble PLL unit may include a phase detector for outputting a signal corresponding to a phase difference between a wobble clock signal corresponding to the wobble signal and a clock signal obtained by dividing the channel clock signal by a factor; a low pass filter for applying the low pass filtering to the output signal of the phase detector; and a voltage control oscillator for outputting the channel clock signal, according to an oscillating frequency being controlled based on the low pass filtering-applied signal, the first control signal being generated based on an output signal of the voltage control oscillator, and the second control signal being generated based on an input signal of the voltage control oscillator according to an embodiment of the present invention.

A wobble signal reproducing device, according to another embodiment of the present invention, may include an automatic gain controller for amplifying a gain of the wobble signal output from the wobble BPF unit; and a comparator for quantizing an output signal of the automatic gain controller and outputting a wobble clock signal.

In the meantime, a wobble signal reproducing device may further include a computation unit for outputting a push-pull signal by use of a signal picked up by wobbling an optical disc; a wobble band pass filter (BPF) unit for applying band pass filtering to the push-pull signal based on a first control signal, applying low pass filtering to the band pass filtering-applied signal based on a second control signal, and outputting a wobble signal; a wobble phase locked loop (PLL) unit for generating a channel clock signal based on the wobble signal; a first control signal generator for generating a clock signal proportional by a factor to the channel clock signal, and generating the first control signal corresponding to the clock signal proportional to the channel clock signal; and a second control signal generator for generating the second control signal corresponding to the channel clock signal.

Accordingly, in embodiments of the present invention, the wobble signal reproducing device can effectively reproduce a wobble signal in the CAV mode in which the spindle motor spins at a constant speed as well as in the CLV mode.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
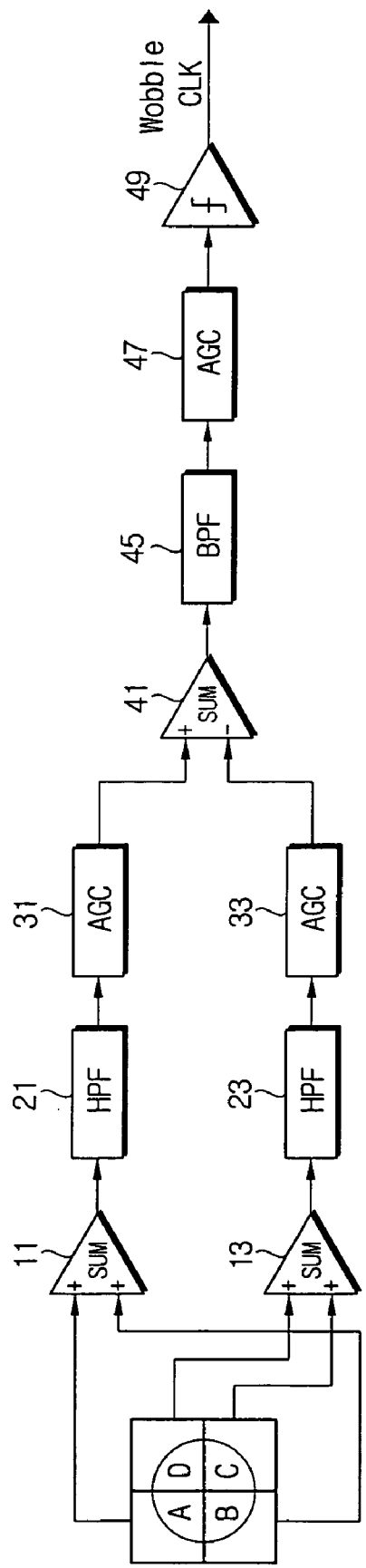
FIG. 1 is a block diagram for schematically showing an existing wobble signal reproducing device.
Figure 2A:
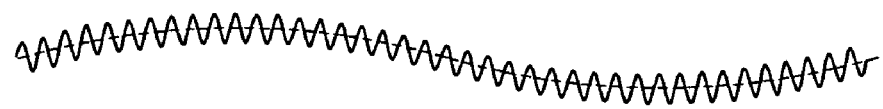
FIGS. 2A-2C show a wobble signal reproducing process for the wobble signal reproducing device shown in FIG. 1.
Figure 2B:
Figure 2C:

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
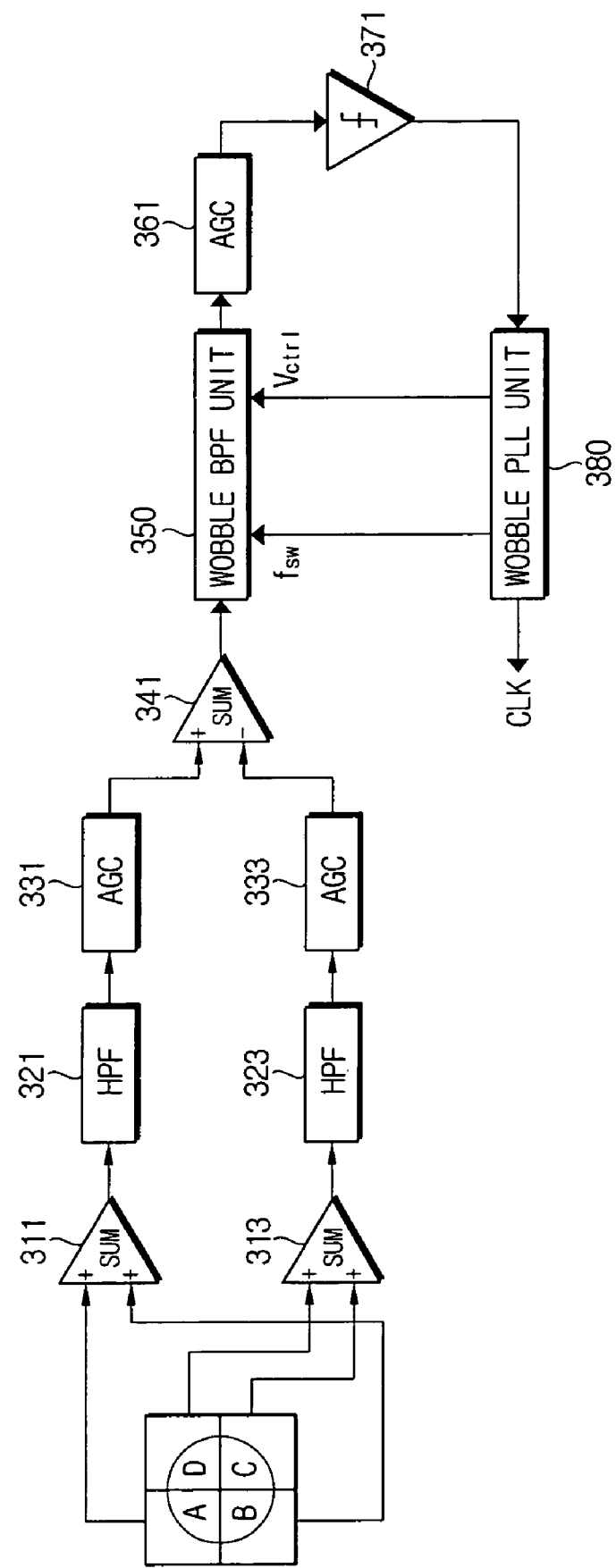
FIG. 3 is a block diagram for schematically showing a wobble signal reproducing device according to an embodiment of the present invention.

FIG. 3 is a block diagram for schematically showing a wobble signal reproducing device that reproduces a wobble signal embedded on an optical disc according to an embodiment of the present invention.

The optical recording/reproducing device forms optical spots on the recording surface of a disc by use of laser beams output from a light source for recording and reproducing an information signal. The reflected laser beams corresponding to a wobble signal on the recording surface of the disc are received by a light-receiving device, and the light-receiving device divides the received optical spots into portions A, B, C, and D, and measures light amounts for outputs. As stated above, the wobble signal is reproduced by using the light amounts corresponding to the optical spots measured on the portions A, B, C, and D of the disc.

The wobble signal reproducing device may include adders 311 and 313 for adding light amounts A and D and light amounts B and C, respectively, as for light amounts A, B, C, and D measured on the portions A, B, C, and D on the disc, high-pass filters (HPFs) 321 and 323 for removing a DC offset in a (A+D) signal and a (B+C) signal, automatic gain controllers (AGCs) 331 and 333 for maintaining constant the amplitude of an RF signal contained in the (A+D) signal and the (B+C) signal, and a subtractor 341 for subtracting the gain-controlled (A+D) signal and (B+C) signal and outputting a push-pull signal, that is, a (A+D)−(B+C) signal.

The wobble BPF unit 350 can employ a band pass filter having a switched capacitor filter (SCF) for varying and filtering the center frequency, and a smoothing filter having a gm-C low pass filter for varying and filtering a cutoff frequency in association with the center frequency with respect to a signal output in a track-and-hold form according to the characteristics of the switched capacitor filter.

The wobble signal filtered by the switched capacitor filter (SCF) and the gm-C low pass filter is amplified to have a constant amplitude in the automatic gain controller (AGC) 361, and output as a wobble clock signal through the comparator 371.

The wobble PLL unit 380 uses the wobble clock signal output from the comparator 371 to output a channel clock signal synchronized with the wobble clock signal. The wobble PLL unit 380 generates a switching frequency fsw for controlling the center frequency of the band pass filter (SCF) and a control voltage Vctrl for controlling the cutoff frequency of the smoothing filter (gm-C LPF) to be associated with the center frequency, based on the channel clock signal output from wobble PLL unit 380. A detailed description will be later made on the switching frequency fsw (hereinafter, referred to as a control frequency) and a control voltage Vctrl that are provided by the wobble PLL unit 380.

Accordingly, the wobble signal can be precisely detected in the CLV mode in which the innermost and outermost of a disc have the same frequency characteristics as well as in the CAV mode in which the innermost and outermost of the disc have different frequency characteristics.

Figure 4:
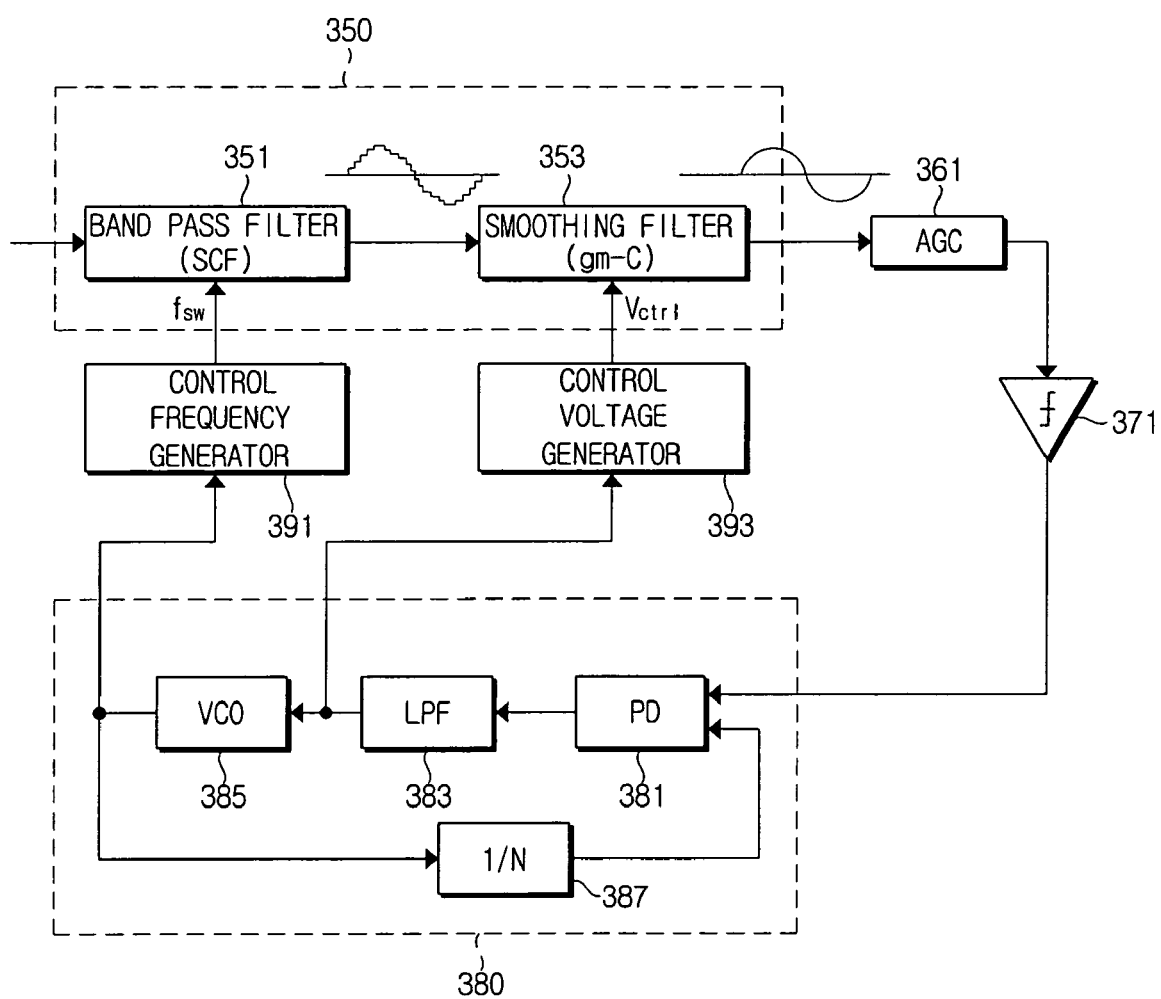
FIG. 4 is a block diagram for showing a wobble signal reproducing device shown in FIG. 3, according to another embodiment of the present invention.

FIG. 4 is a block diagram for showing in detail a wobble signal reproducing device according to an embodiment of the present invention, and, referring to FIG. 4, the present invention will be described in more detail.

As shown in FIG. 4, the wobble signal reproducing device, according to an embodiment of the present invention, includes the wobble BPF unit 350 for filtering the center frequency adaptively varied to the push-pull signal, that is, the (A+D)−(B+C) signal inputted, the wobble PLL unit 380 for outputting a channel clock signal CLK synchronized with the wobble clock signal corresponding to the wobble signal output from the wobble BPF unit 350, and a control frequency generator 391 and a control voltage generator 393 for generating the control frequency fsw and the control voltage Vctrl, respectively, based on the channel clock signal of the wobble PLL unit 380.

First, the wobble PLL unit 380 has a phase detector (PD) 381, a low pass filter 383, a voltage controlled oscillator (VCO) 385, and a frequency divider 387. The phase detector 381 obtains a phase difference between an input wobble clock signal and a channel clock signal divided in the frequency divider 387, and outputs a signal corresponding to the phase difference. The low pass filter 383 filters the output signal of the phase detector 381, and outputs the filtered output signal to the voltage controlled oscillator 385, and the output signal of the low pass filter 383 controls the oscillation frequency of the voltage controlled oscillator 385. Thus, the voltage controlled oscillator 385 outputs a channel clock signal synchronized to the wobble clock signal.

Here, the output and input signals of the voltage controlled oscillator 385 can be processed in the control frequency generator 391 and a control voltage generator 393, and supplied to the wobble BPF unit 350 as a control signal.

The control frequency generator 391 generates a clock signal proportional to the frequency by a factor of the channel clock signal being the output signal of the voltage controlled oscillator 385, with the generated clock signal being provided to the switched capacity filter (SCF) of the wobble BPF unit 350 as the control frequency fsw. For example, a ratio of a wobble clock signal frequency to a channel clock signal frequency in DVD-R/RW and DVD-RAM discs is 1:186. Therefore, the channel clock signal output from the voltage controlled oscillator 385 has to be lowered to a frequency that is processable by the switched capacity filter 351 (SCF). Accordingly, the switched capacitor filter 351 has the center frequency varied in association with the change of the channel clock signal.

The control voltage generator 393 generates the control voltage Vctrl to the gm-C low pass filter 353 of the wobble BPF unit 350 based on a certain voltage being an input signal of the voltage controlled oscillator 385. That is, the control voltage Vctrl varies the cutoff frequency of the gm-C low pass filter 383.

Figure 5A:
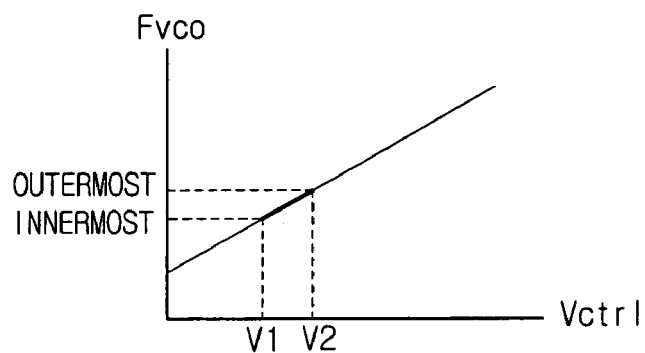
FIGS. 5A-5C explain operations of the control voltage generator 393 of FIG. 4.
Figure 5B:
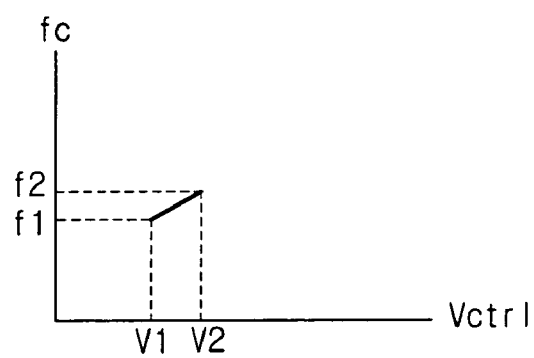
Figure 5C:
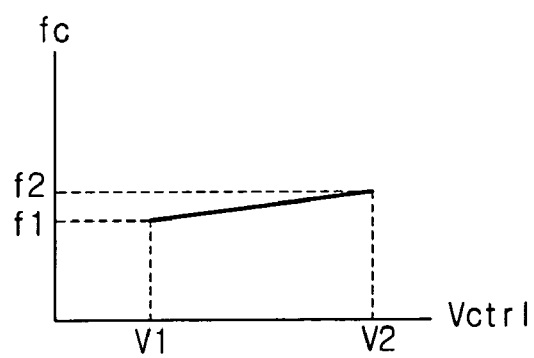

In FIGS. 5A and 5C, for example, as for the innermost and outermost of a disc, FIG. 5A shows an oscillation frequencies Fvco corresponding to voltages Vctrl input to the voltage controlled oscillator 385, and, when the cutoff frequencies f1~f2 of the gm-C low pass filter are designed corresponding to the input voltages V1~V2 of FIG. 5A, accordingly, the control voltage generator 393 applies the input voltages V1~V2 of the voltage controlled oscillator to the gm-C low pass filter as control voltages. Further, as shown in FIG. 5C, if the input voltages V1~V2 are proportional to the cutoff frequencies f1~f2 but not equal to the input voltages V1~V2 of FIG. 5A, the control voltage generator 393 adjusts the input voltages V1~V2 so as to obtain the satisfied cutoff frequencies f1~f2.

The wobble BPF unit 350 has the band pass filter 351 and the smoothing filter 353.

The band pass filter 351 is a filter having a pass band proportional to the channel clock signal output from the wobble PPL unit 380, and implemented with a switched capacitor filter (SCF). That is, as expressed in Equation 1, the center frequency $f_o$ of the band pass filter 351 has the relation with the frequency fsw and capacitors C1 and C2, as below:

$$f_o = \frac{fswEC_2}{2\pi EC_1} \quad \text{Equation 1}$$

As in Equation 1, the center frequency $f_o$ of the switched capacitor filter (SCF) is proportional to the control frequency. Accordingly, if the frequency of a reproduced wobble signal varies as in the CAV mode, the switched capacitor filter (SCF) varies its center frequency $f_o$ in proportion to the channel clock signal corresponding to the frequency of the varied wobble signal, to thereby obtain a pass band adaptive to an input signal.

The wobble signal output from the switched capacitor filter (SCF) is output in a track-and-hold form due to the control frequency fsw. The smoothing filter 353 is implemented to smoothly process a signal in the track-and-hold form. The smoothing filter 353 is implemented with the gm-C low pass filter having the cutoff frequency fc varying with the control voltage in order to solve the problem that a low pass filter having a fixed cutoff frequency fc can not adaptively compensate for the phase difference between the innermost and outermost of a disc like the CAV mode (gm is referred to the mutual conductance being a ratio of input current to output voltage).

That is, the smoothing filter 353 implemented with the gm-C low pass filter has a cutoff frequency fc depending on the control voltage Vctrl corresponding to the channel clock signal output from the wobble PLL unit 380, so the cutoff frequency fc is varying with the center frequency fo.

Figure 6:
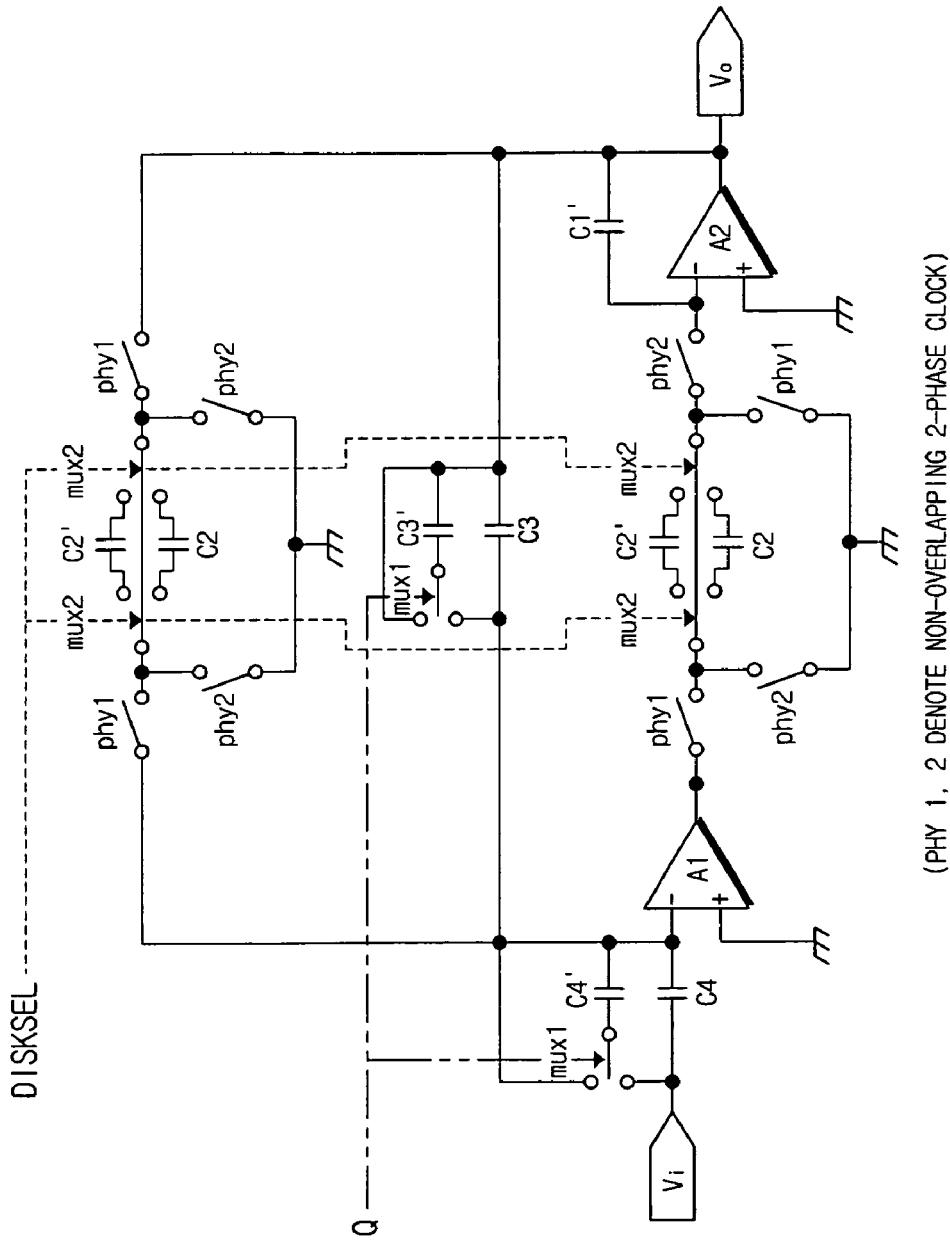
FIG. 6 is a view for showing the band pass filter 351 of FIG. 4, according to another embodiment of the present invention.

FIG. 6 is a view for showing a detailed circuit for the band pass filter 351 implemented with the switched capacitor filter (SCF), according to an embodiment of the present invention. As shown in FIG. 6, the center frequency $f_o$ of the band pass filter is determined by a ratio between the capacitors C1 and C2 (refer to Equation 1).

The band pass filter 351 is inputted with a push-pull signal, that is, a (A+D)−(B+C) signal from the subtractor 341 of FIG. 3 through a $V_i$ terminal, and filters the push-pull signal by varying a center frequency $f_o$ and outputs the filtered signal through a $V_o$ terminal.

The center frequency $f_o$ of the band pass filter 351 is obtained by use of switches phy1 and phy2 which perform switching operation according to the frequency fsw inputted from the control frequency generator 391 and the capacitors C1 and C2 based on the equation 1.

In general, a ratio of a wobble clock signal frequency to a channel clock signal frequency in DVD-R/RW and DVD-RAM discs is 1:186, and a ratio of a wobble clock signal frequency to a channel clock signal frequency in CD-R/RW is 1:196. Accordingly, the center frequency $f_o$ can be determined by a multiplexer mux2 controlled based on the control signal DISKSEL to select a capacitor depending on a CD or a DVD.

Further, the pass bandwidth of the band pass filter can be varied by the multiplexer mux1 controlled based on a control signal Q to select a capacitor C3 or C4.

A detector is disposed on an outer portion of the band pass filter 351 to detect the kind of disk. According to the detected kind of disk, the band pass filter 351 is inputted with the control signal DISKSEL and the control signal Q. The multiplexer mux1 and the multiplexer mux 2 are controlled based on the control signal DISKSEL and the control signal Q to select capacitors (C1, C2, C3 or C4) corresponding to the kind of disk.

The wobble signal filtered through the switched capacitor filter (SCF) shown in FIG. 6 is output in the track-and-hold form, and then the wobble signal is filtered smooth by the smoothing filter 353 that can be diversely designed with the gm-C low pass filter to have the cutoff frequency associated with the center frequency.

Thus, in the CLV mode, the center frequency of a wobble signal is always constant so that the smoothing filter has a constant cutoff frequency, and, in the CAV mode, the center frequencies of the wobble signals between the innermost and outermost of a disc have a 2.4 times difference therebetween, so that the cutoff frequency fc of the smoothing filter is also varied by the difference with respect to the center frequency.

Accordingly, the wobble signal can be effectively reproduced in the CLV mode as well as in the CAV mode in which the spindle motor rotates at a constant speed.

According to embodiments of the present invention, the band pass filter (SCF) can be implemented to have its center frequency vary with a channel clock signal of the wobble PLL circuit, and a smoothing filter (gm-C LFH) can be implemented to have its cutoff frequency vary with the channel clock signal in order to compensate for distortions of a signal filtered in the band pass filter (SCF), so that a wobble signal can be precisely reproduced in the CLV mode as well as in the CAV mode in which the spindle motor rotates at a constant speed.

Further, embodiments of the present invention can be effectively implemented since control signals applied to the switched capacitor filter (SCF) for the band pass filter and to the gm-C low pass filter, for the smoothing filer, can be, generated by use of a wobble PLL circuit provided in an existing optical recording/reproducing device.

Foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

Thus, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wobble signal reproducing device, comprising:
   a computation unit for outputting a push-pull signal based on a signal picked up from an optical disc;
   a wobble band pass filter (BPF) unit for applying band pass filtering to the push-pull signal based on a first control signal, applying low pass filtering to the band pass filtering-applied signal based on a second control signal, and outputting a wobble signal;
   a wobble phase locked loop (PLL) unit for generating a channel clock signal based on the wobble signal, wherein the first and second control signals correspond to the channel clock signal, the wobble BPF unit applies the band pass filtering at a center frequency varied based on the first control signal and applies the low pass filtering at a cutoff frequency varied based on the second control signal.

2. The wobble signal reproducing device as claimed in claim 1, wherein the wobble BPF unit further comprises:
   a band pass filter having a switched capacitor filter (SCF) for varying the center frequency according to a switching frequency being the first control signal, and for applying the band pass filtering at the varied center frequency; and
   a smoothing filter having a gm-C low pass filter for varying the cutoff frequency according to a control voltage signal being the second control signal, and applying the low pass filtering at the varied cutoff frequency.

3. The wobble signal reproducing device as claimed in claim 1, wherein the wobble PLL unit further comprises:
   a phase detector for outputting a signal corresponding to a phase difference between a wobble clock signal corresponding to the wobble signal and a clock signal obtained by dividing the channel clock signal by a factor;
   a low pass filter for applying the low pass filtering to the output signal of the phase detector; and
   a voltage control oscillator for outputting the channel clock signal, according to an oscillating frequency being controlled based on the low pass filtered signal, the first control signal being generated based on an output signal of the voltage control oscillator, and the second control signal being generated based on an input signal of the voltage control oscillator.

4. The wobble signal reproducing device as claimed in claim 1, further comprising:
   an automatic gain controller for amplifying a gain of the wobble signal output from the wobble BPF unit; and
   a comparator for quantizing an output signal of the automatic gain controller and outputting a wobble clock signal.

5. A wobble signal reproducing device, comprising:
   a computation unit for outputting a push-pull signal based on a signal picked up from an optical disc;
   a wobble band pass filter (BPF) unit for applying band pass filtering to the push-pull signal based on a first control signal, applying low pass filtering to the band pass filtering-applied signal based on a second control signal, and outputting a wobble signal;
   a wobble phase locked loop (PLL) unit for generating a channel clock signal based on the wobble signal;
   a first control signal generator for generating a clock signal proportional to a factor of the channel clock signal, and generating the first control signal corresponding to the clock signal proportional to the channel clock signal; and
   a second control signal generator for generating the second control signal corresponding to the channel clock signal.

6. The wobble signal reproducing device as claimed in claim 5, wherein the wobble BPF unit further comprises:
   a band pass filter having a switched capacitor filter (SCF) varying a center frequency according to a switching frequency being the first control signal, and for applying the band pass filtering at the varied center frequency; and
   a smoothing filter having a gm-C low pass filter for varying a cutoff frequency according to a control voltage signal being the second control signal, and applying the low pass filtering at the varied cutoff frequency.

7. The wobble signal reproducing device as claimed in claim 5, wherein the wobble PLL unit further comprises:
   a phase detector for outputting a signal corresponding to a phase difference between a wobble clock signal corresponding to the wobble signal and a clock signal obtained by dividing the channel clock signal by a factor;
   a low pass filter for applying the low pass filtering to the output signal of the phase detector; and
   a voltage control oscillator for outputting the channel clock signal, according to an oscillating frequency being controlled based on the low pass filtered-applied signal, the first control signal being generated based on an output signal of the voltage control oscillator, and the second control signal being generated based on an input signal of the voltage control oscillator.

8. The wobble signal reproducing device as claimed in claim 5, further comprising:
   an automatic gain controller for amplifying a gain of the wobble signal output from the wobble BPF unit; and
   a comparator for quantizing an output signal of the automatic gain controller, and outputting a wobble clock signal.

9. A method for producing a wobble signal, comprising:
   outputting a push-pull signal based on a signal picked up from an optical disc;
   band pass filtering the push-pull signal based on a first control signal;
   applying a low pass filtering to the band pass filtered signal based on a second control signal, and outputting a wobble signal;
   generating a channel clock signal based on the wobble signal, wherein the first and second control signals correspond to the channel clock signal.

10. The method for reproducing the wobble signal of claim 9, further comprising:
    varying a center frequency according to a switching frequency being the first control signal;
    applying the band pass filtering at the varied center frequency;
    varying a cutoff frequency according to a control voltage signal being the second control signal; and
    applying the low pass filtering at the varied cutoff frequency.

11. The method for producing the wobble signal of claim 9, wherein the generating of the channel clock signal further comprises:
    outputting a signal corresponding to a phase difference between a wobble clock signal corresponding to the wobble signal;
    obtaining a clock signal by dividing the channel clock signal by a factor;
    applying the low pass filtering to the output signal; and
    outputting the channel clock signal, according to an oscillating frequency being controlled based on the low pass filtered output signal, generating the first control signal based on the output signal, and generating the second control signal based on the lowpass filtered output signal.

12. The method for producing the wobble signal of claim 9, further comprising:
    amplifying a gain of the wobble signal;
    quantizing an output signal of the amplified gain of the wobble signal; and outputting a wobble clock signal.

13. A method for reproducing a wobble signal, comprising:
    outputting a push-pull signal based on a signal picked up from an optical disc;
    band pass filtering the push-pull signal based on a first control signal;
    low pass filtering the band pass filtered signal based on a second control signal;
    outputting a wobble signal;
    generating a channel clock signal based on the wobble signal;
    generating a clock signal proportional to a factor of the channel clock signal;
    generating the first control signal corresponding to the clock signal proportional to the channel clock signal; and
    generating the second control signal corresponding to the channel clock signal.

14. The method of claim 13, wherein band pass filtering further comprises:
    varying a center frequency according to a switching frequency being the first control signal;
    applying the band pass filtering at the varied center frequency;
    varying a cutoff frequency according to a control voltage signal being the second control signal; and
    applying the low pass filtering at the varied cutoff frequency.

15. The method of claim 13, wherein the channel clock signal further comprises:
    outputting a signal corresponding to a phase difference between a wobble clock signal corresponding to the wobble signal;
    obtaining a clock signal by dividing the channel clock signal by a factor;
    applying the low pass filtering to the output signal of the phase detector; and
    outputting the channel clock signal, according to an oscillating frequency being controlled based on the low pass filtered-applied signal, generating the first control signal corresponding to the clock signal proportional to the channel clock signal; and
    generating the second control signal corresponding to the channel clock signal.

16. The method of claim 13, further comprising:
    amplifying a gain of the wobble signal; and
    quantizing an output signal of the amplified gain of the wobble signal; and
    outputting a wobble clock signal.

* * * * *